US012718226B2

(12) United States Patent
Metral et al.

(10) Patent No.: US 12,718,226 B2
(45) Date of Patent: Aug. 25, 2026

(54) FAULT TOLERANT TOKEN BASED TRANSACTION SYSTEMS

(71) Applicant: PAYPAL, INC., San Jose, CA (US)

(72) Inventors: Max Edward Metral, Brookline, MA (US); Douglas Hurst, Longmont, CO (US); Kevin Laracey, San Jose, CA (US); Suzanne Lenox, Weston, MA (US)

(73) Assignee: PAYPAL, INC., San Jose, CA (US)

( * ) Notice: Subject to any disclaimer, the term of this patent is extended or adjusted under 35 U.S.C. 154(b) by 70 days.

(21) Appl. No.: 18/174,512

(22) Filed: Feb. 24, 2023

(65) Prior Publication Data

US 2023/0274258 A1 Aug. 31, 2023

Related U.S. Application Data

(63) Continuation of application No. 17/362,924, filed on Jun. 29, 2021, now Pat. No. 11,593,790, which is a continuation of application No. 14/986,416, filed on Dec. 31, 2015, now Pat. No. 11,049,096.

(51) Int. Cl.
*G06Q 20/36* (2012.01)
*G06Q 20/32* (2012.01)

(52) U.S. Cl.
CPC ........... *G06Q 20/36* (2013.01); *G06Q 20/326* (2020.05)

(58) Field of Classification Search
CPC ..... G06Q 20/36; G06Q 20/405; G06Q 20/326
USPC .......................................................... 705/41
See application file for complete search history.

(56) References Cited

U.S. PATENT DOCUMENTS

| | | | |
|---|---|---|---|
| 5,739,512 | A | 4/1998 | Tognazzini |
| 7,040,533 | B1 | 5/2006 | Ramachandran |
| 7,379,921 | B1 | 5/2008 | Kiliccote |
| 7,483,858 | B2 | 1/2009 | Foran et al. |
| 7,798,394 | B2 | 9/2010 | Hill et al. |
| 7,992,776 | B1 | 8/2011 | Ramachandran et al. |

(Continued)

FOREIGN PATENT DOCUMENTS

| | | | | |
|---|---|---|---|---|
| CN | 102346889 B | * | 4/2014 | |
| CN | 105447687 A | * | 3/2016 | ............. G06Q 20/02 |

(Continued)

OTHER PUBLICATIONS

Biswas, Nitish. "A secure multiparty micropayment protocol for internet access over WLAN mesh networks." PhD diss., Toronto Metropolitan University, 2011. (Year: 2011).*

(Continued)

*Primary Examiner* — Sara C Hamilton
(74) *Attorney, Agent, or Firm* — Haynes and Boone, LLP

(57) ABSTRACT

Methods and systems for fault tolerant token based transactions are described. A user may perform a transaction with a mobile device. The mobile device may be in an offline mode or may be lacking a network connection to servers or cloud devices of a mobile payment system. The transaction may be processed through a transaction device, which may aid in the sending and receiving of transaction data while the mobile device is in the offline mode. The transaction device may communicate with the server or cloud device and the server or cloud device may process the transaction and communicate with the transaction device, which may forward data from the server or cloud device to the mobile device.

20 Claims, 7 Drawing Sheets

(56) References Cited

U.S. PATENT DOCUMENTS 9,275,506 B1* 3/2016 Whitmore .......... G06Q 20/3572
10,049,349 B1* 8/2018 Grassadonia .......... G06Q 20/40
2003/0004737 A1 1/2003 Conquest et al.
2003/0110717 A1 6/2003 Rodriguez
2003/0126064 A1 7/2003 Foran et al.
2005/0136884 A1 6/2005 Reidelsturz et al.
2005/0203854 A1 9/2005 Das et al.
2006/0105742 A1 5/2006 Kim et al.
2006/0206709 A1 9/2006 Labrou et al.
2007/0219752 A1 9/2007 Aoyama et al.
2007/0295805 A1 12/2007 Ramachandran
2008/0034221 A1 2/2008 Hammad et al.
2008/0048022 A1 2/2008 Vawter
2008/0133351 A1 6/2008 White et al.
2008/0164306 A1 7/2008 Gu
2008/0222048 A1 9/2008 Higgins et al.
2009/0063312 A1 3/2009 Hurst
2009/0164375 A1 6/2009 Saunders et al.
2009/0254479 A1 10/2009 Pharris
2010/0017327 A1 1/2010 Treadwell et al.
2010/0070537 A1 3/2010 Amidon et al.
2010/0125510 A1 5/2010 Smith et al.
2010/0312617 A1* 12/2010 Cowen .................. G06Q 20/40 705/13
2011/0055084 A1 3/2011 Singh
2011/0066550 A1 3/2011 Shank et al.
2011/0191252 A1 8/2011 Dai
2011/0231238 A1 9/2011 Khan et al.
2011/0238573 A1 9/2011 Varadarajan
2011/0251892 A1 10/2011 Laracey
2012/0022973 A1 1/2012 Makhotin et al.
2012/0187187 A1 7/2012 Duff et al.
2012/0203700 A1 8/2012 Ornce et al.
2013/0054336 A1 2/2013 Graylin
2013/0110654 A1 5/2013 Kobres
2013/0110676 A1 5/2013 Kobres
2013/0110717 A1 5/2013 Kobres
2013/0110727 A1 5/2013 Kobres
2013/0110728 A1 5/2013 Kobres
2013/0117862 A1 5/2013 Farrell et al.
2013/0124411 A1 5/2013 Kobres et al.
2013/0132234 A1 5/2013 Grossi et al.
2013/0140361 A1* 6/2013 Ling .................. G06Q 20/3274 235/494
2013/0173474 A1* 7/2013 Ranganathan ..... G06Q 20/0655 705/67
2013/0179285 A1 7/2013 Lyle
2013/0179352 A1 7/2013 Dwyre et al.
2013/0185214 A1* 7/2013 Azen ...................... G06Q 20/20 705/76
2013/0311313 A1 11/2013 Laracey
2015/0006386 A1* 1/2015 Tebbe ................ G06Q 20/3274 705/44
2015/0066769 A1* 3/2015 Tallal, Jr. ............... G06Q 20/20 705/44
2015/0112870 A1 4/2015 Nagasundaram et al.
2015/0142672 A1* 5/2015 Ling .................. G06Q 20/4014 705/76
2015/0170131 A1* 6/2015 Patel .................... G06Q 20/326 705/44
2015/0186883 A1 7/2015 Song
2015/0262174 A1* 9/2015 Mongillo, III ......... G06Q 20/40 705/16
2015/0278795 A1* 10/2015 Jiang .................. G06Q 20/3823 705/44
2015/0278796 A1* 10/2015 Jiang .................. G06Q 20/3825 705/44
2015/0339318 A1 11/2015 O'Toole et al.
2016/0005024 A1* 1/2016 Harrell ................... G06Q 20/40 705/39
2016/0012430 A1 1/2016 Chandrasekaran et al.
2016/0110718 A1* 4/2016 Jajara ................ G06Q 20/4016 705/44
2016/0180317 A1 6/2016 Cozens et al.
2016/0292668 A9 10/2016 Aracey
2016/0328692 A1 11/2016 Camps et al.
2017/0032370 A1* 2/2017 Beltramino ............ G06Q 20/20
2017/0161723 A1 6/2017 Hill et al.
2017/0178090 A1* 6/2017 Sarin .................. G06Q 20/3224
2017/0178091 A1* 6/2017 Sarin .................... G06Q 20/105
2017/0200149 A1 7/2017 Antunovic et al.
2017/0206519 A1 7/2017 Taveau et al.
2018/0232732 A1 8/2018 Rodrigues et al.
2018/0322497 A1 11/2018 Lewis
2019/0132134 A1 5/2019 Noe et al.
2023/0196328 A1* 6/2023 Xiu ...................... G06Q 20/401 705/16

FOREIGN PATENT DOCUMENTS

EP 1264259 B1 2/2007
JP 2002032686 A 1/2002
JP 2002109421 A 4/2002
JP 2003141402 A 5/2003
JP 2003521028 A 7/2003
JP 2004246536 A 9/2004
JP 2004326348 A 11/2004
JP 2005092338 A 4/2005
JP 2005157426 A 6/2005
JP 2005276023 A 10/2005
JP 2006099713 A 4/2006
JP 2006243842 A 9/2006
JP 2006277715 A 10/2006
JP 2007034941 A 2/2007
JP 2007299316 A 11/2007
JP 2008129787 A 6/2008
JP 2008217277 A 9/2008
JP 2008242828 A 10/2008
JP 2009080729 A 4/2009
JP 2009276838 A 11/2009
KR 20060084520 A 7/2006
KR 20100018744 A 2/2010
KR 20110039946 A 4/2011
WO 0163546 A1 8/2001
WO 2008153096 A1 12/2008
WO 2010035224 A2 4/2010
WO 2010125577 A1 11/2010
WO WO-2014006618 A1 * 1/2014 ........... A63F 13/792
WO WO-2015148850 A1 * 10/2015 ............. G06Q 20/12

OTHER PUBLICATIONS

NTTDATA., "Bill Paying by Mobile Phone Using Barcode Capture", Retrieved from Internet URL: http://www.nttdata.com/global/en/newscenter/global/2006/pdf/110800.pdf, Nov. 8, 2006, 4 pages.

* cited by examiner

FAULT TOLERANT TOKEN BASED TRANSACTION SYSTEMS

CROSS-REFERENCE TO RELATED APPLICATION

The present application is a continuation of U.S. patent application Ser. No. 17/362,924, filed Jun. 29, 2021, which is a continuation of U.S. patent application Ser. No. 14/986,416, filed Dec. 31, 2015, issued Jun. 29, 2021, as U.S. Pat. No. 11,049,096, all of which are incorporated herein by reference in their entirety.

BACKGROUND

Field of the Invention

The present invention generally relates to tokenized transactions, and more particularly to using an electronic wallet to process an in-person transaction.

Related Art

Increasingly, mobile phones may be used to conduct electronic transactions. However, conventional mobile transaction systems and schemes generally suffer from a number of problems, including network failures or unavailability resulting in an inability to communicate needed information for a transaction.

Figure 1:
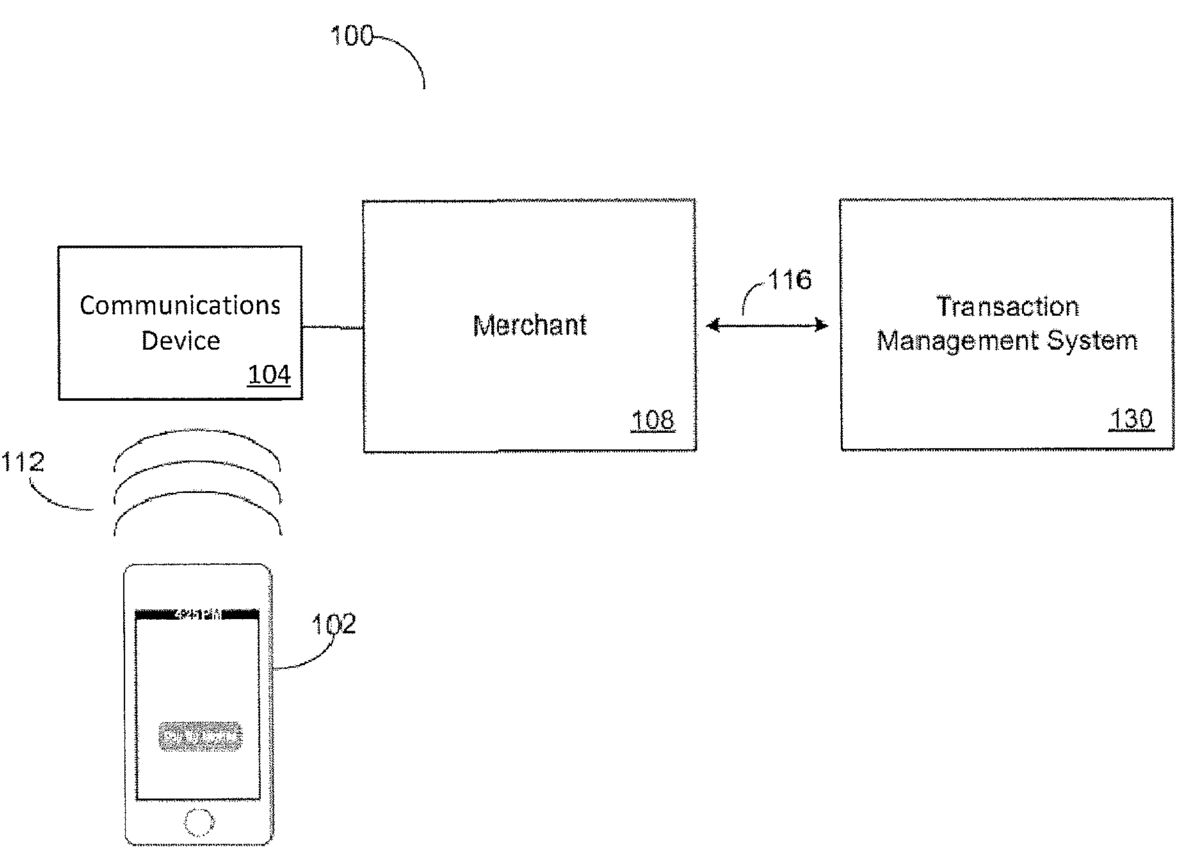
FIG. 1 is a block diagram showing a payment system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that facilitate transactions using mobile wallets. The present disclosure describes some embodiments where a mobile device may be used to initiate or aid in the processing of a transaction at a merchant location such as with an automated teller machine, a payment kiosk, a check-out counter, point of sale (POS) device, or the like, using a mobile wallet. The present disclosure describes embodiments where a mobile device may be used to obtain a checkout token for use in a transaction where the token is wirelessly communicated to a merchant for use in a transaction. In certain embodiments, the token may be obtained before the transaction is initiated. The techniques described herein may be performed with communication between the mobile device and the merchant location through any wireless communication techniques including, for example, Bluetooth and other Bluetooth standard protocols such as Bluetooth Low Energy, Wi-Fi, Near Field Communications (NFC), Quick Response (QR) codes, bar codes, scanning of other codes, wired data transmission, and other communication techniques. It is understood that though certain embodiments may be described as being performed with one or a plurality of communication techniques, such description is illustrative and is not limiting of possible communication modes.

The advent of the internet has allowed mobile phones or other mobile devices (e.g., tablets, laptops, personal data assistants, and/or wearable electronic devices) to be used as payment devices. Users may pay for goods or services using electronic mobile wallets. Such mobile wallets may be at least partially contained within a server (e.g., the internet cloud), and accessible from the mobile device via the internet. In some embodiment, when the user pays for goods or services (or otherwise conducts a transaction) using the mobile wallet, the electronic device may transmit a token to the server through, for example, wireless communication, scanning of a graphic displayed on the electronic, and/or through another manner. The server may receive the token and process the transaction according to the token received. However, the mobile device may be disconnected from the internet in certain instances, which may prevent the transaction from being processed. The present invention may allow the processing of the transaction while the mobile device is disconnected from the internet, resulting in advantages including the user being able to conduct a transaction (such as purchasing and receiving goods or services), the merchant being able to make a sale, and the service or wallet provider being able to obtain revenue from the transaction.

The present invention may be performed with certain payment systems. FIG. 1 is a block diagram showing a payment system according to an embodiment of the disclosure. FIG. 1 includes a mobile device 102, a communications device 104, a merchant 108, and a transaction management system 130. The mobile device 102 may be connected to a communications device 104 via a communication path 112. The communications device 104 is connected to a merchant 108. The merchant 108 may be in communication with one or more payment networks 116. The payment network 116 may allow direct or indirect communication to the transaction management system 130.

A mobile wallet payment account holder, buyer, user, or operator (the "customer" or the "user") may have, use, or operate the mobile device 102. The mobile device 102 may be, for example, a smartphone, a personal data assistant, a tablet, a wearable electronic device (such as a smartwatch or electronically augmented glasses), a laptop, or other electronic device. The mobile device 102 may include a user interface that includes a combination of one or more of a display screen, a data entry device such as a keypad or touch screen, buttons, facial or movement recognition abilities, or other items allowing a user to interface with the mobile device 102. The user may use the mobile device 102 to conduct a transaction with the merchant 108.

The communications device 104 may be, for example, part of a point of sale terminal or point of transaction. The point of sale terminal or point of transaction may be a kiosk, an automated teller machine, a checkout machine, a mobile device, a scanner, or another device that allows a user or customer to purchase, check out, and/or pay for items. The merchant may be a physical store, an electronic commerce merchant, a mail order and/or telephone merchant, an individual, a pending machine, kiosk, or other unattended device, or another individual or entity that offers products or services for sale. The communications device 104 may allow communications (e.g., between the merchant 108 and the mobile device 102) over various communications protocols, such as Bluetooth, Bluetooth Low Energy (BLE), WiFi, NFC, QR codes, bar codes, scanning of other codes, wired data transmission, and other communication techniques.

As shown in FIG. 1, the merchant 108 may be in communication with one or more payment networks 116. The transaction management system 130 may include one or more servers that may, for example, include a hard drive or other storage device that may store data associated with the mobile wallets of account holders. Such data may be, for example, account identifiers or account numbers, user information such as name, contact information (e.g., phone numbers, e-mails, social media accounts, messaging service accounts, or other contact information), contact preferences, account information (e.g., bank account information, balance information, credit card numbers, expiration dates, or PIN numbers), and account balance, information on the location of the user (such as where the user has been), and other information associated with the account holder. The transaction management system 130 may process transactions carried out between the mobile device 102 and the merchant 108 by, for example, confirming payment associated with the transaction and transferring funds from the user's account to that of the merchant's account.

In some embodiments, the communication between a merchant 108 and one or more payment networks 116 may be direct or indirect communication. Direct communication may be communication where the merchant 108 is directly in contact with one or more servers of the transaction management system 130. Indirect communication may be communication where the merchant 108 is in communication with one or more servers of the transaction management system 130 via one or more intermediaries such as merchant processors or gateway providers.

In an illustrative example, a user operating the mobile device 102 may approach a point of transaction to conduct a transaction. The user may interact with a payment application on the mobile device 102 to initiate the transaction. The user may select to pay with a mobile wallet account by selecting a mobile wallet payment option displayed or communicated to the user on the mobile device 102 or by performing an action such as a tapping the mobile device 102 on a terminal or payment device of the merchant 108. The payment application may then, in certain embodiments, optionally prompt the user to authenticate themselves through the entry of a password (either character based and/or action based, such as by performing a series of movements with the finger of the user), a fingerprint scan, an iris scan, a voiceprint authentication, or other authentication technique.

After authentication, the mobile device 102 may then continue the transaction by passing one or more checkout tokens, as well as other data associated with the transaction, to the communications device 104 via the communication path 112. In certain embodiments, the checkout token may be a token previously obtained by the transaction management system 130. For example, the checkout token may have been obtained by the mobile device 102 when the mobile device previously had a network connection to the transaction management system 130 (e.g., before the mobile device 102 was placed in an "offline mode" or lost connection to the transaction management system). The checkout token may be, for example, a transaction identifier, an account identifier, a session identifier, a wallet identifier, a user identifier, or the like. In some embodiments, the checkout token may be formatted such that it may be processed or routed using the payment network 116 via the communication path 112. The checkout tokens may be configured so that the mobile device 102 may store or cache the checkout token for use at a later transaction.

In some embodiments, the checkout token may be combined with other transaction data by the merchant 108 into a payment authorization request. The merchant 108 may then transmit the payment authorization request to the payment network 116 (to be processed and/or delivered to the transaction management system 130). The merchant 108, in other embodiments, may send the token in one message and other data associated with the transaction in other message(s). The merchant 108 in yet other embodiments may only send the checkout token to the payment network 116. In some embodiments, the merchant, processor or other entity may add additional information to the request message including, for example, a merchant identifier, a terminal identifier, a time stamp, a date stamp, or the like. In some embodiments, the merchant 108 may process the checkout token and the data associated with the transaction with a single device, such as a mobile point of sale device including devices that enable magnetic stripe and EMV (Eurocard, Mastercard, and Visa) translations to be performed such as devices from companies like PayPal, Square, Ingenico Verifone, and others, with multiple devices, or with a mobile device for person to person transactions, or the like.

The payment network 116 (or an acquirer processor or other entity associated with the payment network 116), analyzes data and/or message(s) sent from the merchant 108 and determines whether the data and/or message(s) should be routed to the transaction management system 130. This routing determination may be made at or by any of a number of different devices or entities, including, for example, at a payment terminal, at a retailer system (such as at the point of transaction, point of sale, or at a retailer payment switch), at a payment gateway, at a merchant processor system, at a payment network, or at a payment card issuer system (or any other system capable of reading information that would normally be passed on by the payment terminal to enable authorization of a payment transaction). In some embodiments, the routing determination may be made by the merchant 108, e.g., by consulting a BIN table or other routing table and comparing values in a BIN table or other routing table to values in the checkout token or other data that is communicated from the mobile device 102 along with the checkout token to the merchant 108.

After the transaction management system 130 receives the checkout token, the transaction management system 130 may attempt to match the checkout token with an existing identifier associated with an active mobile wallet session or may attempt to match the checkout token with a mobile wallet account. When a match occurs, the transaction management system 130 may then process a transaction. After the transaction has been processed, the transaction management system 130 may then send a transaction notification. The transaction notification may specify whether the transaction has been successfully or unsuccessfully processed.

In some embodiments, such as when the transaction management system 130 is unable to match the checkout token with an active session (or pending transaction record)

or mobile wallet account, the transaction management system 130 may first determine if the checkout token received was a valid checkout token. In some embodiments, a checkout token's validity may be determined by looking at a number of data values that may include (but are not be limited to) the presence of the token in a list of issued and outstanding checkout tokens, determining if the checkout token had expired based on time to live values assigned to the token, the presence of a valid digital signature or other value created by the mobile device 102 and/or the merchant 108, the identity of the merchant 108, information identifying the mobile device 102 used in the transaction, the amount of the transaction, the time of day, a security profile associated with the merchant 108, a security profile associated with the device, and other factors and use restrictions.

Assuming that the checkout token was determined to be valid, the transaction management system 130 may authorize payment using a default payment credential, since the absence of an active session with the mobile device 102 may mean that the user would not be able to provide the transaction management system 130 with a payment selection in real time. One or more default payment instruments may be specified by the user as part of the signup process or default setting selection. Multiple default instruments might be specified, since some merchants might not accept the users "preferred" default instrument such as an American Express® card. In addition, the user might specify rules describing which payment instrument or instruments should be selected based on the amount of the purchase, the merchant, the instrument that maximizes loyalty points earned, the instrument that results in the lowest price for the user, or a number of other factors. These and other factors may be evaluated separately or in combination to come up with the best selection of payment instrument for the user. With this technique, a user might specify that if a gift card balance exists for a gift card that can be used for a particular transaction at a particular merchant, then the gift card balance should be exhausted with any remaining outstanding amount to be applied against the customer's preferred credit card. In this way, even without an active session and without interactively specifying which instruments to use to pay for a transaction, a split tender/multi-tender transaction can be completed.

In certain other embodiments, the user may select a payment credential or method via the mobile device 102. In such embodiments, the mobile device 102 may communicate the payment credential or method selected by the user to the merchant 108. The merchant 108 may then communicate the selection to the transaction management system 130.

Figure 2:
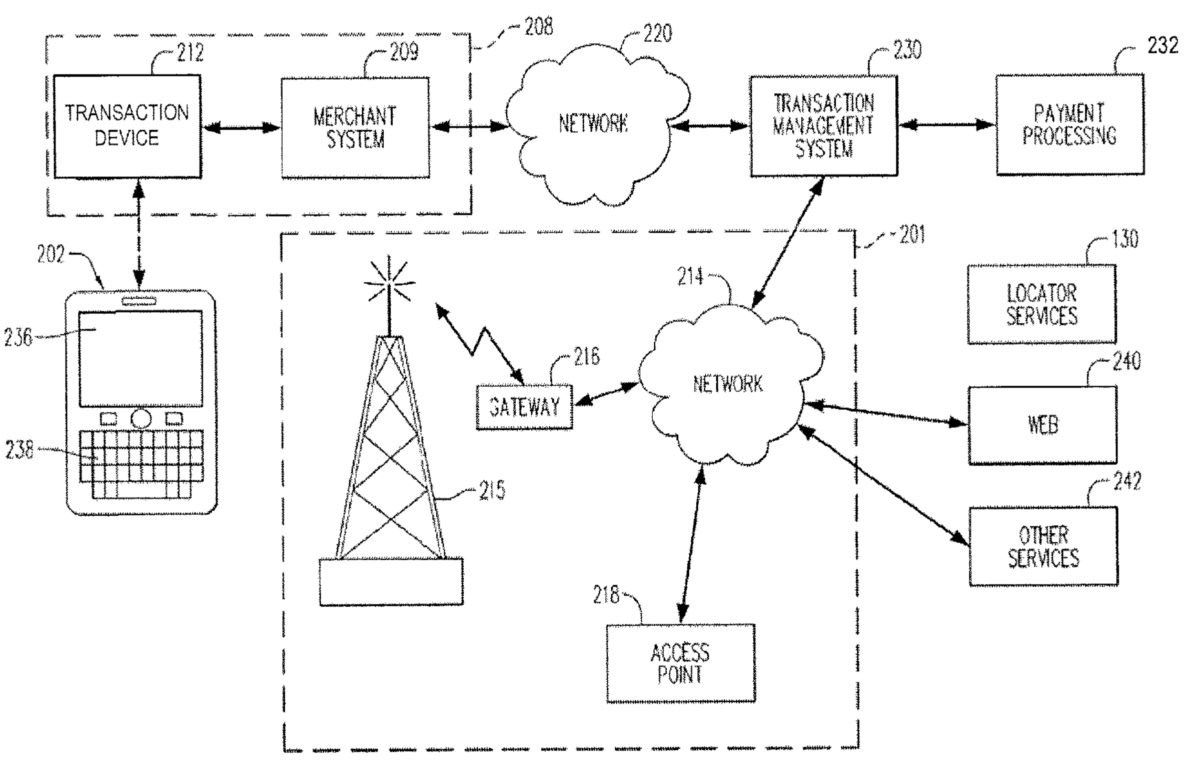
FIG. 2 is a block diagram showing further details of a payment system according to an embodiment of the disclosure.

Further details of the present invention may be described with reference to FIG. 2. FIG. 2 is a block diagram showing further details of a payment system according to an embodiment of the disclosure. The payment system of FIG. 2 includes a mobile device 202, a merchant 208, a transaction management system 230, and payment processing systems 232. The mobile device 202 may be similar to the mobile device 102 of FIG. 1. The mobile device 202 may be a mobile device having an RFID chip installed therein allowing the device to be operated pursuant to ISO/IEC 18092, NFC IP-1 or the ISO/IEC 14443 contactless communication standards, or other applicable contactless communication standards and wireless technologies including but not limited to those for Bluetooth and Bluetooth Low Energy (BLE) and NFC. Pursuant to some embodiments, mobile device 202 may operate a payment application allowing mobile device 202 to operate as a payment device as described herein.

Mobile device 202 may be configured to communicate over one or more wired and/or wireless networks 201. As an example, a wireless network may include a cellular network (represented by a cell transmitter 215). A mobile device 202 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11g, Bluetooth (or other) communication standards. For the purposes of this disclosure, the mobile device 202 may, in certain examples, be in an offline mode. In offline mode, the mobile device 202 may be unable to communicate with the networks 201.

Mobile device 202 may include a display screen 236 and a data entry device 238 (such as a keypad or touch screen, or voice interface). Pursuant to embodiments of the present invention, the customer may use the mobile device 202 to conduct a purchase transaction with a merchant 208. The merchant 208 may be similar to the merchant 108 of FIG. 1. In some embodiments, the mobile device 202 may also include a camera (not shown) or other image capture device which may allow the mobile device 202 to capture an image or representation of a checkout token. The mobile device 202 may also capture, obtain or generate a checkout token which may be communicated to a merchant 208 via wireless technologies such as NFC, Bluetooth, Bluetooth Low Energy, Wi-Fi, or audio.

The merchant 208 may operate one or more merchant systems 209 to process payments and transactions, including payment transactions pursuant to the present invention (as well as "traditional" or standard payment transactions involving cash, standard payment cards, or the like). The merchant system 209 may be a networked point of sale system (such as for a physical retail location) or it may be a shopping cart system (such as for an electronic commerce or Internet retail location). Merchant system 209 may be a combination of systems designed to allow a merchant to accept payments for goods or services. In some embodiments, merchant system 209 may be used in communication with one or more transaction devices 212 which may present and receive information from customers. For example, in the situation where the merchant 208 is a physical retail location, a merchant system 209 may be in communication with a number of different transaction devices 212, each of which may be located at a different checkout lane or location within the store (or in different stores in different geographical locations). Each of the transaction devices 212 may present, display, or communicate transaction information to customers at the point of sale so that the customer can approve or authorize purchases and present payment for the purchases. In certain embodiments, the transaction device 212 may include a Bluetooth, Bluetooth Low Energy, NFC, or other wireless communication module enabling communications between a mobile device 202 and transaction device 212.

As another example, where the merchant 208 is an Internet or other electronic commerce merchant, the merchant system 209 may be a Web server (or a network of servers, some of which may be Internet accessible) configured to process purchase transactions associated with merchant 208. Transaction device 212, in such an example, may be one or a number of remote terminals nearby the mobile device 202 that may interact with merchant system 209 such as, for example, personal computers, mobile devices, kiosks, automated teller machines, or the like that are able to interact with the merchant system 209 via a network such as the Internet.

In certain embodiments, either the mobile device 202 or the merchant 208 may initiate a transaction. The device initiating the transaction may then broadcast a transaction identifier that may include a service identifier indicating the identity or function (such as "checkout kiosk," "customer service device," or "mobile checkout device") of the device and a unique ID belonging to the device. The other device may then receive the transaction identifier and possibly confirm the transaction by, for example, confirming the transaction (through, for example, the transaction identifier) with the transaction management system 230. The transaction identifier may be any item that may identify the transaction. In certain embodiments, the transaction identifier may, for example, be separate from checkout tokens, but in other embodiments, the transaction identifier may be include checkout tokens or may be embedded within checkout tokens. Once the transaction has been confirmed, the mobile device 202 may then transmit a checkout token and, possibly, other data associated with the transaction to the transaction device 212.

After the merchant 208 receives the checkout token from the mobile device 202 (via the communications link between the mobile device 202 and the transaction device 212), the merchant 208 may transmit a merchant payment authorization request message to the transaction management system 230 over a network 220. The routing of the message to the transaction management system 230 may include mapping to or identifying the transaction management system 230 from information from within the checkout token.

In some embodiments, the merchant 208 and/or the transaction management system 230 (by way of a message routed through the merchant 208) may then transmit a customer payment confirmation request message to the customer's mobile device 202, enabling the customer to have a final opportunity to confirm or cancel the payment transaction. For example, the customer may be prompted to "confirm" or "cancel" the payment transaction. The prompt may provide additional information about the transaction and the selected payment account so the customer can have detailed information about the transaction before selecting "confirm" or "cancel." In some embodiments, customers may be given the opportunity to set preferences or otherwise configure the mobile payment application to enable or disable certain messages or transaction steps. As a specific example, customers may be given the opportunity to receive (or not receive) customer payment confirmation request messages.

Afterwards, the transaction management system 230 may create an authorization approval request message for transmission through one or more payment processing network(s) 232 to cause the authorization, clearing and settlement of funds for the transaction. This request message may include the transaction details, such as the amount of the transaction or other information, from the merchant payment authorization request (received from the merchant 208) and the actual payment credentials associated with the payment account selected by the customer. The actual payment credentials may be obtained by using the payment account selection information and performing a lookup of actual payment account credentials previously stored in a database or location accessible to the transaction management system 230. The authorization approval processing may be performed using standard financial authorization processing over one or more payment processing networks 232 (e.g., such as the VISANET® network operated by Visa, Inc., an Automated Clearing House system such as NACHA, PayPal®, or the like). Once the availability of funds is confirmed, the transaction management system may then send a merchant payment authorization response message to the merchant 208 so the transaction can be completed at the point of sale 212, and a customer payment authorization response message to the customer's mobile device 202.

Figure 3:
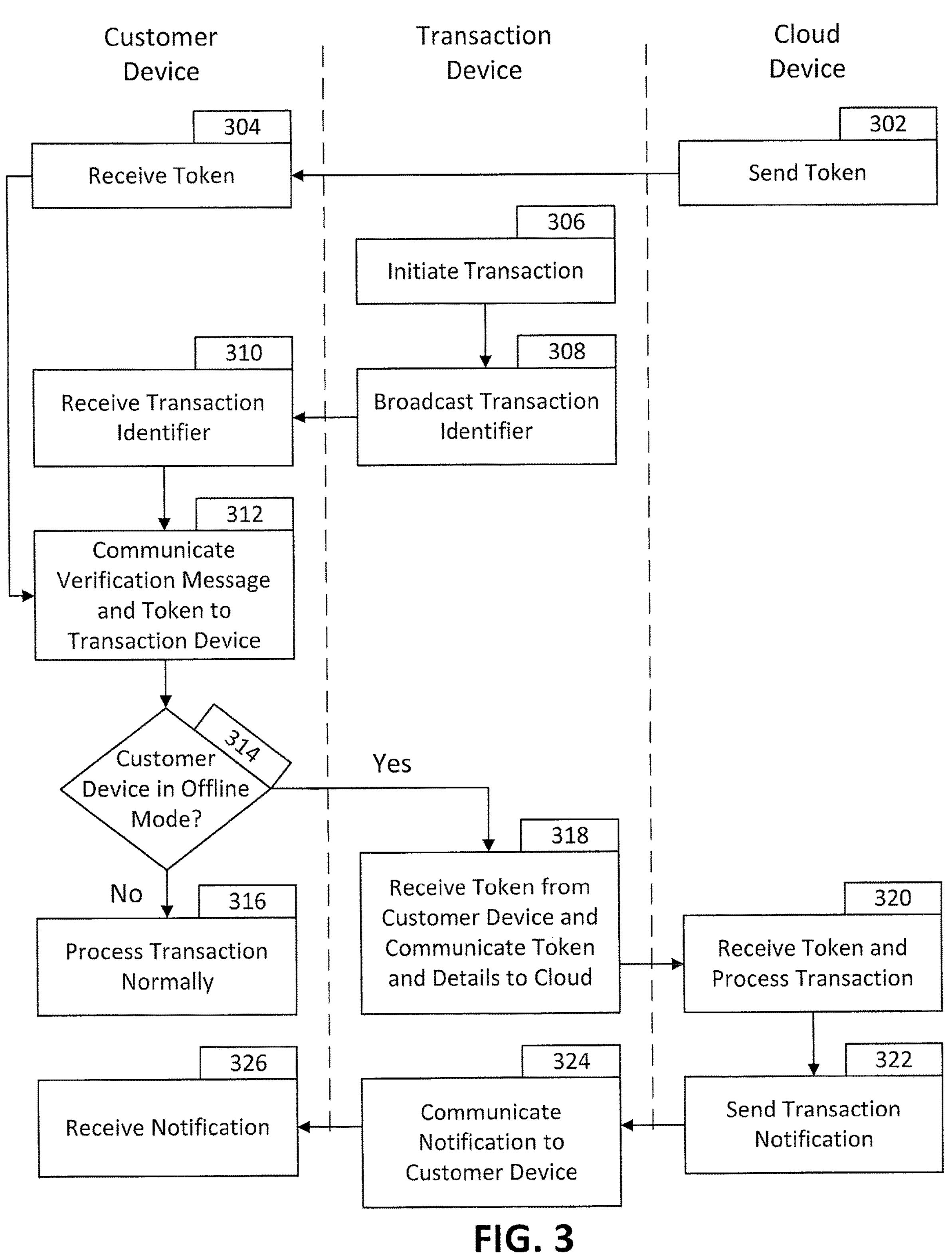
FIG. 3 is a flowchart showing fault tolerant mobile payment according to an embodiment of the disclosure.

The fault tolerant payment or transaction process performed by the systems described herein may be further illustrated in FIG. 3. FIG. 3 is a flowchart showing fault tolerant mobile payment according to an embodiment of the disclosure. For the purposes of this disclosure, a "fault tolerant payment process" may be a payment process where the mobile device may lose connection to the transaction management system, or may be a payment process where the mobile device has been placed in an offline mode. The process need not be limited to payment transactions, as other transactions involving token communications described herein may also be suitable, such as identity verification.

Figure 4:
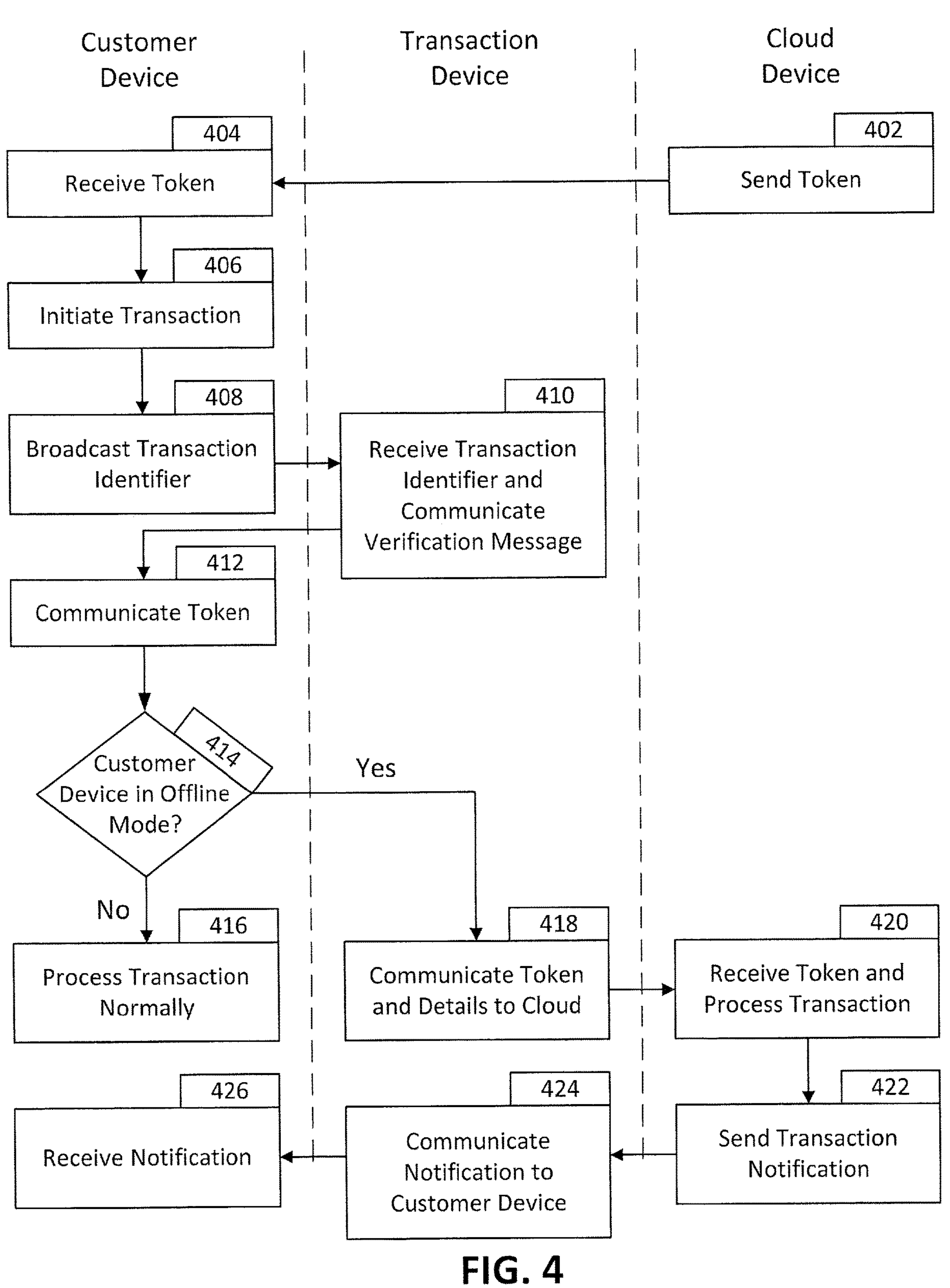
FIG. 4 is a flowchart showing another fault tolerant mobile payment according to an embodiment of the disclosure.

The flowchart of FIG. 3, as well as FIG. 4, divides the processes performed into customer device processes, transaction device processes, and cloud device processes. The customer device may be, for example, a mobile electronic device such as mobile device 102 or 202 of FIGS. 1 and 2. The transaction device may be, for example, the merchant 108 with the associated communications device 104 or the merchant 208 of FIGS. 1 and 2. The cloud device may include, for example, the payment network 116 and the transaction management system 130 of FIG. 1 or one, some, or all of the network 220, the transaction management system 230, and/or the payment processing networks 232 as well as associated communications components such as the wireless networks 201. It is appreciated that various embodiments may perform certain processes with a different component than that described herein. Thus, a process described as being performed by the customer device may be performed, in certain embodiments, by the transaction device and/or the cloud device.

The fault tolerant mobile payment process described in FIG. 3 may be a payment process transaction initiated by the transaction device. In block 302, the cloud device may communicate a checkout token to the customer device. The checkout token may be associated with a pending transaction or may be communicated in advance of a transaction.

In block 304, the customer device may receive the checkout token from the cloud device. The checkout token may be communicated and received in advance of a transaction. Checkout tokens communicated in advance of the transaction may be stored and managed by the customer device. The checkout tokens may be static tokens, the checkout tokens may be managed and there may be, in certain embodiments, token usage rules to govern a lifecycle of the checkout token. In certain embodiments, the checkout tokens may be stored with a secure checkout token storage strategy that may include usage rules for the checkout tokens as well as rules to limit liability of stolen or compromised checkout tokens.

In block 306, a transaction may be initiated by the transaction device. The transaction may be initiated according to a transaction with the customer, initiated by the customer device and/or the transaction device. The transaction initiation may be, for example, the scanning of a barcode of a product for sale, the entering of information of an item being bought, the adding to cart or checkout of an item on a kiosk or electronic device.

In block 308, the transaction device may broadcast a transaction identifier. The transaction identifier may, for example, include a combination of a service identifier identifying the type of device broadcasting the transaction identifier and a unique ID identifying the party that the device belongs to. Additionally, the transaction identifier may also contain information identifying the location of the transaction device, including, for example, a kiosk number, as well as information identifying the transaction itself, the amount of the transaction, items purchased by the transaction, and other information. In certain embodiments, the transaction identifier may include a prefix. The prefix may identify the type of device sending the transaction identifier. Transaction identifiers of other embodiments may include a checkout token that may be passed from the transaction device to the customer device. Such a checkout token may be received from the cloud device in response to the initiation of the transaction. In such an embodiment the processes of blocks 302 and 304 may be skipped.

In block 310, the transaction identifier may be received by the customer device. The customer device may then process the transaction identifier. For example, in certain embodiments, the transaction identifier, as well as other data, may be encrypted (e.g., through public key infrastructure "PKI", keyed-hash message authentication code "HMAC", or other encryption techniques) by the transaction device and/or the cloud device (for embodiments where the transaction identifier is first created by the cloud device and then communicated to the transaction device) and the customer device may receive the encrypted transaction identifier. The customer device, upon receiving the transaction identifier, may then process the transaction identifier by decrypting and/or validating (e.g., confirming that the transaction is a valid transaction or that the checkout token and/or the transaction identifier has not been tampered with) the transaction identifier. Other embodiments may decrypt and/or validate the checkout token and/or transaction identifier with the transaction device. Additionally, processing of the transaction identifier may include, for example, obtaining certain information from the transaction identifier and creating a verification message that may add information from the customer device to the information obtained from the transaction identifier. For example, certain embodiments may create a verification message that may combine information identifying the transaction (such as the transaction amount, the items or services involved in the transaction, or the time of transaction) included in the transaction identifier with, for example, information identifying the customer device (such as information as to the type of electronic device of the customer device and/or the identity of the electronic device itself). Other embodiments may create a verification message from other information. It is understood that for the purposes of this disclosure, the verification message may include any combination of information received by the customer device from the transaction device along with any data or information contained by the customer device.

In block 312, the verification message, along with the checkout token, may be communicated from the customer device to the transaction device. The checkout token may be the checkout token received from the cloud device in block 304, a checkout token broadcasted along with the transaction identifier in block 308, or a checkout token obtained from another source or obtained previous to the current transaction. Various embodiments of the customer device may maintain such checkout tokens until they are communicated to the transaction device in block 312.

In block 314, the software installed on the customer device may determine whether the customer device is in an offline mode. In offline mode, the customer device may be unable to communicate with, for example, the wireless networks 201 and/or the network 220, the transaction management system 230, and the payment processing systems 232. In various examples, the customer device may be in the offline mode due to a lack of network signal (e.g., lack of cellphone or data signal), due to the device being placed in an offline mode or mode where data may not be received (such as shutting off a data connection on the phone), or due to a personal choice by the customer to process the transaction via the offline mode. Software on the customer device may detect that it is in an offline mode by monitoring the status of its connection with the cloud device. For example, the customer device may attempt communication with the cloud device on a regular interval, and if it detects after a period of time that it cannot communicate with the cloud device, the customer device may make the determination that it is in offline mode until such time as communication with the cloud device can be re-established. Alternatively, the cloud device may be in session with the transaction device and may detect that it is unable to communicate with the customer device and thus determine that the customer device is in an offline mode. The cloud device may then communicate to the transaction device the determination that the customer device is in an offline mode. Additionally, in certain embodiments, the customer device, the transaction device, and/or the cloud device may determine that the customer device is in an offline mode at other parts of the transaction process (such as when the transaction is initiated). Other embodiments may skip block 314 entirely and may assume that the transaction is carried out in the offline mode. In such an embodiment, the customer device may automatically process the transaction in the offline mode may thus automatically proceed to block 318.

If the customer device is not detected to be in an offline mode in block 314, the process may proceed to block 316 and the transaction may proceed normally, e.g., with the customer device communicating , to the cloud device, the checkout token obtained from the transaction device. In such a situation, the customer device may communicate transaction information and/or the checkout token to the cloud device.

If the customer device is detected to be in an offline mode in block 314, the process may proceed to block 318. In block 318, the customer device may communicate the checkout token, as well as other transaction details, to the transaction device. The transaction device may then communicate the checkout token received from the customer device and details of the transaction, either received from the customer device and/or determined by the transaction device itself, to the cloud device. The token and transaction details may be sent as one message, or as multiple messages. In certain embodiments, the checkout token may be sent in a message separate from that of the transaction details. In other embodiments, the checkout token may include transaction details. The transaction details may include information received from the verification message. Examples of information that may be sent from the transaction device to the cloud device via the checkout token and/or the transaction information include information related to the identity of the customer device, information associated with the transaction (e.g., transaction amount, items and/or services involved in the transaction, the identity of the purchaser and/or seller, the geographical location of the purchaser, seller, and/or transaction, information related to the checkout token, and other information). Information may be communicated from the transaction device to the cloud device via, for example, the merchant device 209 and/or the network 220 of FIG. 2. Additionally, communications between the transaction device and the cloud device may also be via other devices and networks such as payment switches and merchant acquirers. While certain embodiments of the transaction device may communicate the checkout token obtained from the customer device to the cloud device in response to the determination that the customer device is in offline mode, other embodiments may communicate any checkout token obtained from the customer device to the cloud device regardless of customer device mode.

After block 318, the cloud device, in block 320, may receive the checkout token and transaction details and process the transaction via, for example, the transaction management system 130 of FIG. 1 or the transaction management system 230 and/or payment processing system 232 of FIG. 2. The transaction may be processed by, for example, using the checkout token and/or transaction details received to lookup the actual payment credentials associated with the account(s) identified. The actual payment credentials may be stored in a system accessible to the transaction management system 230. The actual payment credentials may be used to obtain payment transaction authorization from the appropriate payment network and/ or financial institution. The appropriate payment network and/or financial institution may then provide a response that may include information as to whether the transaction was accepted or rejected.

The response of the payment network and/or financial institution may be sent as a transaction notification by the cloud device to the transaction device in block 322. The response may be sent through, for example, intermediaries such as point of sale devices, acquirers, networks, etc. that will link the cloud device to the transaction device. The transaction notification may include information as to whether the transaction was accepted or rejected. In certain embodiments, in block 324, the transaction device may communicate or forward the transaction notification to the customer device as the customer device, in offline mode, may be unable to receive notifications from the cloud device. The transaction notification may be received by the customer device in block 326. The customer device may then display the transaction notification on a user interface such as a display.

A fault tolerant payment process as described in FIG. 3 may be illustrated with the following example. Sean wants to purchase a video game and thus picks out a box containing the video game from within a store and brings the box to a checkout kiosk. The checkout kiosk may then scan a barcode located on the box to initiate the transaction. In this example, the transaction will be carried out through a payment app located on Sean's phone.

After the checkout kiosk has scanned the barcode located on the box, the checkout kiosk may broadcast a transaction identifier. The transaction identifier in this example may include a service identifier identifying the checkout kiosk and a unique merchant ID. The kiosk may be configured to broadcast the transaction identifier over Bluetooth, Bluetooth Low Energy, or another Bluetooth or other wireless communications standard. In this example, the kiosk may broadcast the transaction identifier over Bluetooth Low Energy and, though the payment app on Sean's phone had not yet been loaded prior to receiving the transaction identifier, upon detecting the broadcasting of the transaction identifier, Sean's phone may automatically load the payment app.

Sean's phone may receive the transaction identifier and the payment app on Sean's phone may then load and authenticate the transaction identifier and reply to the transaction device/kiosk with a verification message and a checkout token. The checkout token may be a checkout token that is stored on Sean's phone and has been managed by the payment app. The verification message may include information as to the identity of Sean's phone and details of Sean's payment app account. The verification message may be sent in a previously specified format, such as a DSSSID that may identify Sean's phone.

The kiosk may, after broadcasting the transaction identifier, listen for the verification message and the checkout token. In such a case, the kiosk may then receive the checkout token and the verification message. Once the kiosk receives the verification message and/or the checkout token, it may then match the information on the verification message and/or checkout token with information of an ongoing session (e.g., a "handshaking" session or process) with a customer device. The kiosk may thus match the information received with that of an ongoing transaction and verify that the customer device has approved of or agreed to the transaction.

Once the kiosk has matched the information received from the verification message and/or checkout token with an ongoing transaction, the kiosk may then send transaction details and the checkout token received from the customer device to a cloud device or server that may then process the session with the customer device. In this example, the servers receiving the transaction details and checkout token may be servers associated with PayPal®, which may offer mobile wallet payment services to users and clients.

Once the server has received the transaction details and checkout tokens, the server may then process the transaction by determining if there is a matching checkout token and/or transaction associated with the information received. The server may then confirm or reject the transaction and may send information specifying whether the transaction has been confirmed or rejected back to the kiosk via a transaction notification. Upon receiving the transaction notification, the kiosk may display visual notice of the transaction notification, such as a message stating "Transaction Successful" on a display or through the flashing of lights on the kiosk to denote success or failure of the transaction. In certain embodiments, the kiosk may then push the transaction notification to Sean's phone for Sean's phone to display. The payment app of Sean's phone may then store the transaction notification for future reference.

Fault tolerant mobile payments may also be performed in alternative process flows. Such an alternative process may be shown in FIG. 4. FIG. 4 is a flowchart showing another fault tolerant mobile payment according to an embodiment of the disclosure. The process illustrated in FIG. 3 may be a customer device initiated transaction process.

In blocks 402 and 404, the cloud device may send a checkout token and the customer device may receive the checkout token, respectively. Blocks 402 and 404 may be substantially similar to blocks 302 and 304 of FIG. 3, respectively.

In block 406, the customer device may initiate the transaction. The transaction may be initiated by the selection of a checkout option on the customer device, by the scanning of a barcode, Quick Response (QR) code, or other image, by selecting a purchase option on a user interface of the customer device, by a voice command from a user, or through another indication that a user may wish to initiate a transaction via the customer device.

In block 408, the customer device may broadcast a transaction identifier. The transaction identifier may, for example, include a combination of a service identifier identifying the type of device broadcasting the transaction identifier and a unique ID identifying the customer device, the party that the customer device belongs to, and/or an account related to the owner of the customer device. Additionally, the transaction identifier may also contain information identifying the location of the customer device, such as the global position or last known position of the customer device, as well as information identifying the transaction itself, the amount of the transaction, items purchased by the transaction, and other information. In certain embodiments, the transaction identifier may include a prefix and a DSSSID. The prefix may identify the type of device sending the transaction identifier and the DSSSID may identify the device. In certain embodiments, information identifying a customer device may have different formats from information identifying a transaction device. For example, an identification sequence of a prefix, DSSSID, or other information chain that identifies a transaction device may start with an "a" while a corresponding information sequence that identifies a customer device may start with a "b." Additionally, transaction identifiers may also include information embedded within a checkout token that may be passed from the customer device to the transaction device.

In block 410, the transaction identifier may be received by the transaction device. The transaction device may then process the transaction identifier by, for example, obtaining certain information from the transaction identifier and creating a verification message that may add information from the transaction device to the information obtained from the transaction identifier. For example, certain embodiments may create a verification message that may combine information identifying the transaction included in the transaction identifier with, for example, information identifying the transaction device (such as the merchant identity, the kiosk number, the location of the kiosk, the type of checkout device, or other information). Other embodiments may create a verification message from other information. It is understood that for the purposes of this disclosure, the verification message may include any combination of information received by the transaction device from the customer device along with any other data or information that the transaction device may possess.

After the customer device receives the verification message from the transaction device, the customer device may communicate the checkout token to the transaction device. In certain embodiments, the custome device may determine that the transaction device is the correct device before communicating the checkout token to the transaction device. The checkout token may be the checkout token received from the cloud device in block 404, a checkout token received along with the transaction verification in block 410, or a checkout token obtained from another source or obtained previous to the current transaction. As such, the checkout token from the cloud device may be communicated through a plurality of modes such as, for example, 1) where the checkout token from the cloud device is passed from the customer device to the transaction device and 2) where the checkout token from the cloud device is passed from the transaction device to the customer device. In the embodiment shown in FIGS. 3 and 4, the customer device may receive the checkout token ahead of the transaction and may be is cached ahead of time and/or retrieved in real time if there is good connectivity. In other embodiments, the customer device may, instead of receiving the checkout token from the cloud device in block 404, instead receive the checkout token from the transaction device. If the checkout token is a checkout token received along with the transaction verification in block 410, the transaction device may have received the checkout token from the cloud device after receiving the transaction identifier (e.g., by requesting a checkout token associated with the transaction from the cloud device) or may be a checkout token received from the cloud device prior to receiving the transaction identifier and managed by the transaction device (e.g., a "cached token mode"). The transaction device may maintain such checkout tokens until they are communicated to the customer device.

In block 414, the software installed on the customer device may determine whether the customer device is in an offline mode. Detecting whether the customer device is in an offline mode in block 414 may be substantially similar to that described for block 314.

If the customer device is not detected to be in an offline mode in block 414, the process may proceed to block 416 and the transaction may proceed normally. In such a situation, the customer device may communicate transaction information and/or the checkout token to the cloud device.

If the customer device is detected to be in an offline mode in block 414, the process may proceed to block 418. In block 418, the transaction device may communicate the checkout token received from the customer device and details of the transaction to the cloud device. Communication of the checkout token and the details of the transactions communicated to the cloud device in block 418 may be substantially similar to that described in block 318.

After block 418, the cloud device may receive the checkout token and transaction details and process the transaction in block 420. Block 420 may be substantially similar to block 320. Processing the transaction may include obtaining or attempting to obtain payment transaction authorization from the appropriate payment network and/or financial institution. The response of the payment network and/or financial institution may be sent as a transaction notification by the cloud device to the transaction device in block 422, which may be substantially similar to block 322. The transaction notification may include information as to whether the transaction was accepted or rejected. In block 424, the transaction device may communicate or forward the transaction notification to the customer device as the customer device, in offline mode, may be unable to receive notifications from the cloud device. The transaction notification may be received by the customer device in block 426. Blocks 424 and 426 may be similar to blocks 324 and 326 of FIG. 3.

Figure 5:
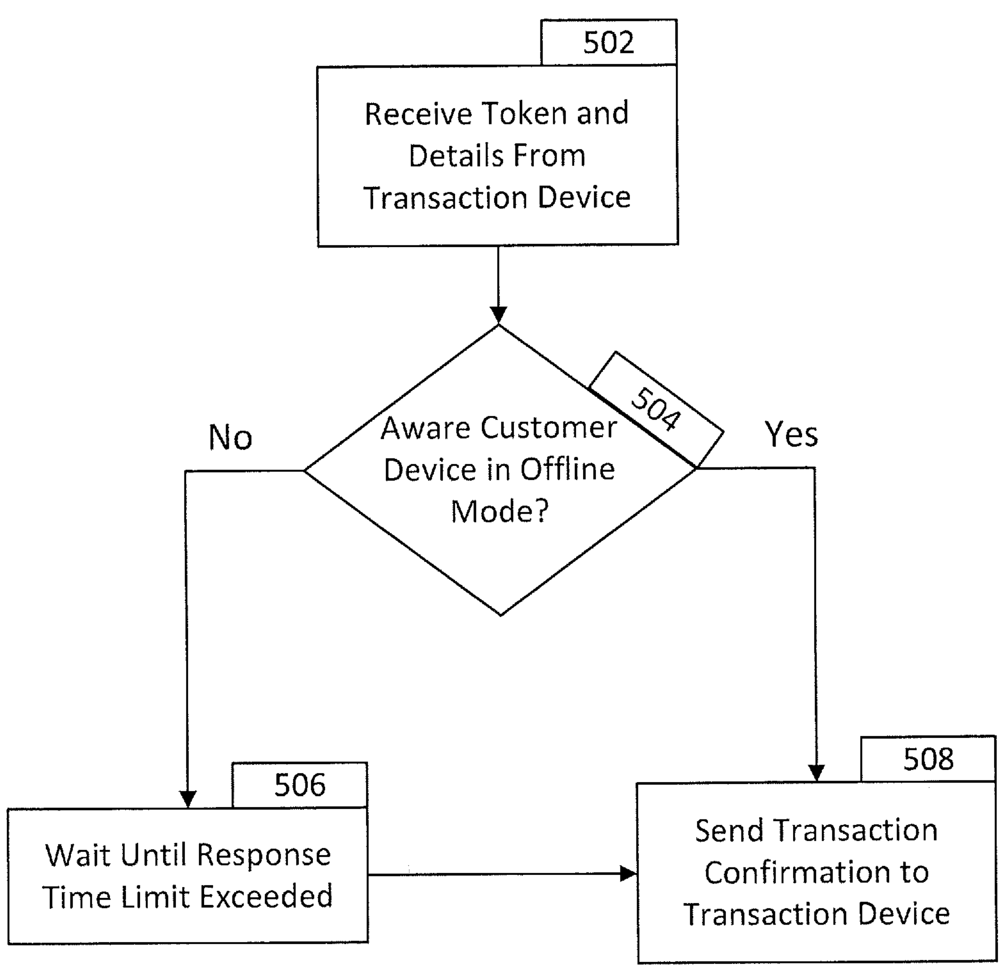
FIG. 5 is a flowchart showing fault tolerant payment processing according to an embodiment of the disclosure.

In certain embodiments, the cloud device may determine whether the customer device is in an offline mode. The cloud device may make this determination by, for example, the process illustrated in FIG. 5. FIG. 5 is a flowchart showing fault tolerant payment processing according to an embodiment of the disclosure.

In block 502 of FIG. 5, the checkout token may be received from the transaction device. Block 502 of FIG. 5 may correspond to blocks 320 and 420 of FIGS. 3 and 4, respectively. In block 504, the cloud device checks whether there is any indication that the customer device is in an offline mode. The indication may be from, for example, communications received from the transaction device (such as the checkout token and/or the transaction details received in block 502).

If the cloud device is not aware that the customer device is in an offline mode, the process may advance to block 506. In block 506, the cloud device may detect that the customer device is in an offline mode. The cloud device may detect that the customer device is in an offline mode due to the cloud device being unable to communicate with the customer device. For example, the cloud device may, upon receiving the checkout token and/or transaction details from the merchant device, commence tracking a response time. The response time may be an amount of time elapsed after receiving the checkout token and/or transaction details from the merchant device. The cloud device may track the response time and, when the amount of elapsed time has exceeded a response time limit, the cloud device may then determine that the customer device is in an offline mode.

Once the cloud device has determined that the customer device is in an offline mode, whether in block 506 or earlier, the cloud device may then send a transaction notification to the transaction device in block 508. The transaction notification sent in block 508 may be similar to the transaction notifications sent in blocks 322 and 422 of FIGS. 3 and 4, respectively.

Figure 6:
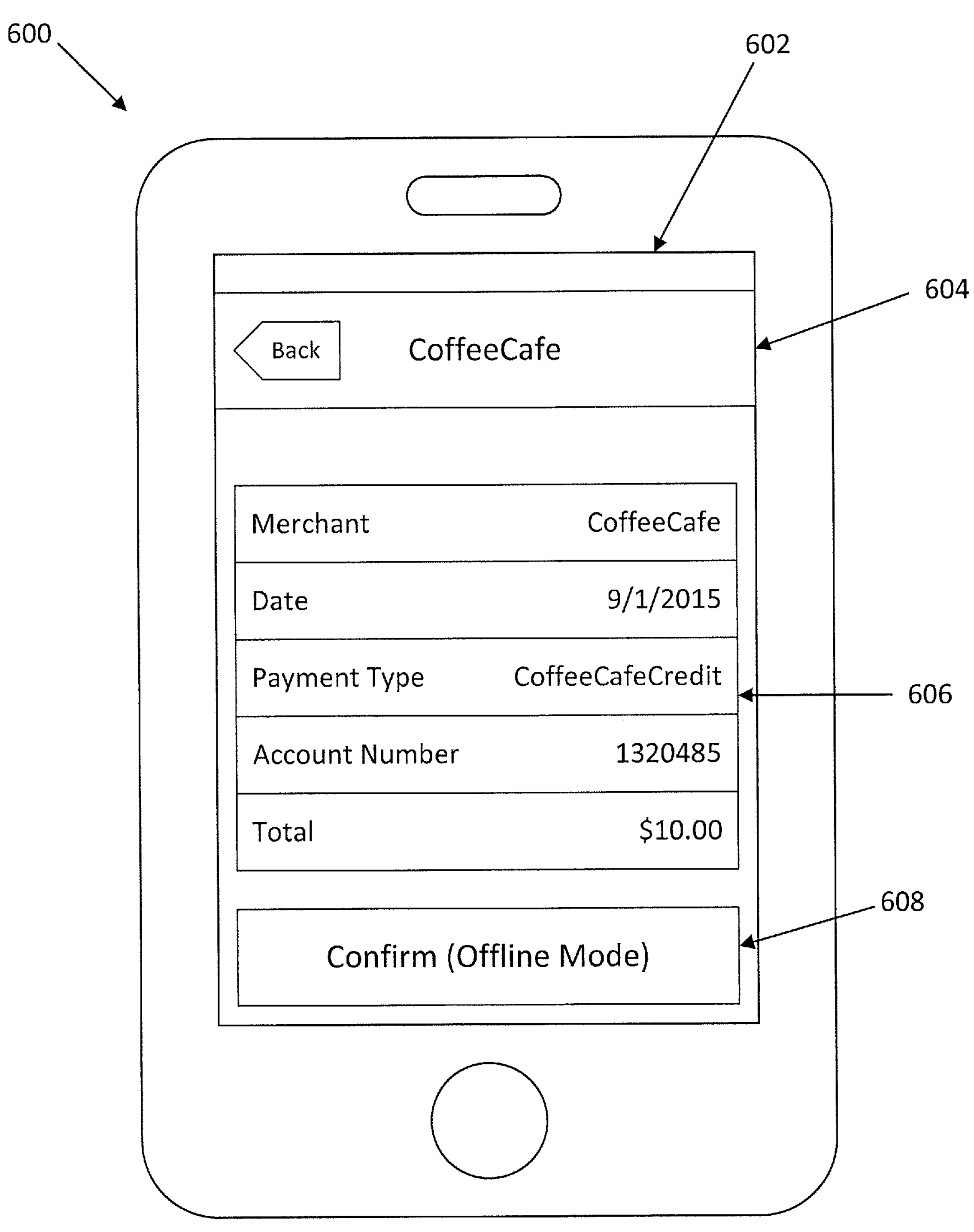
FIG. 6 shows a user interface according to an embodiment of the disclosure.

The customer device described herein may include a user interface that allows a user to initiate or perform certain steps within the transaction. FIG. 6 shows a user interface according to an embodiment of the disclosure.

The customer device 600 of FIG. 6 may include a user interface 602. The user interface 602 may display a confirmation page that may include a transaction title 604, a transaction summary 606, and a confirmation button 608. The transaction title 604 may include information related to the merchant (such as the name of the merchant) as well as an option to cancel the transaction or scroll back to another page. The transaction summary 606 may include information related to the transaction, including information related to the merchant, the transaction date, the transaction type, any payment accounts involved in the transaction, the transaction total, the items purchased, the time of purchase, any discounts, and other information that may be relevant to the transaction. The confirmation button 608 may be a button that may allow the user to confirm the transaction. After the user has pressed the confirmation button 608, a purchase transaction may then be initiated or confirmed by the user.

In certain embodiments, the user interface may provide an indication that the transaction is being conducted in an offline mode. For example, the transaction title 604, the transaction summary 606, and/or the transaction button 608 may include such an indication. In the example of FIG. 6, the transaction button 608 includes an indication that the transaction is being performed in an offline mode.

Figure 7:
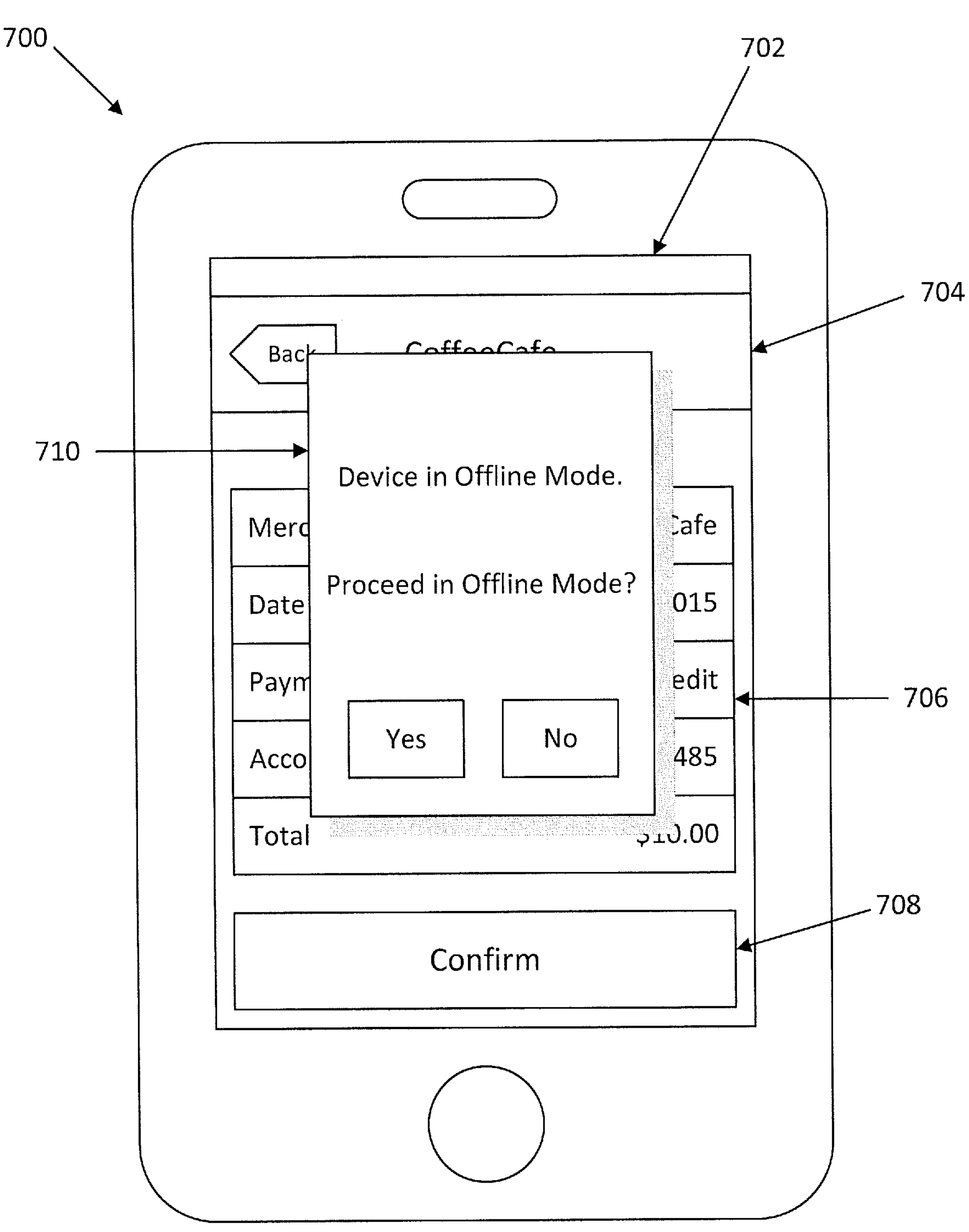
FIG. 7 shows a further user interface according to an embodiment of the disclosure.

The process and techniques disclosed herein may be performed through other configurations of user interfaces. FIG. 7 shows a further user interface according to an embodiment of the disclosure. The user interface configuration shown in FIG. 7 may be used as an alternative to the user interface configuration of FIG. 6.

The customer device 700 of FIG. 7 may include a user interface 702. The user interface 702 may display a confirmation page that may include a transaction title 704, a transaction summary 706, a confirmation button 708, and a confirmation window 710. The transaction title 704, the transaction summary 706, and the confirmation button 708 may be similar to the transaction title 604, the transaction summary 606, and the transaction button 608, respectively, of FIG. 6.

In FIG. 7, the transaction button 708 may not include an indication that the customer device is in an offline mode. Instead, for the customer device 700 of FIG. 7, the customer device may determine that the transaction will be performed in an offline mode after the transaction has been confirmed by the user. The customer device may then display the confirmation window 710 and ask the user to confirm the processing of the transaction in offline mode. After the user has given his or her confirmation, purchase transaction may then be initiated or confirmed. In other embodiments, the customer device may automatically detect that it is in an offline mode and may process the transaction accordingly without notifying the user that it is in the offline mode.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:

initiating, by a merchant device of a merchant, a processing of a pending transaction with a mobile device of a user based on a transaction identifier associated with the pending transaction;

broadcasting, by the merchant device, the transaction identifier using wireless communications;

receiving, by the merchant device via the wireless communications and responsive to the broadcasting the transaction identifier, an indication that the mobile device is in an offline mode for network communications and is unable to communicate with a transaction management system over a network during the processing of the pending transaction, wherein the offline mode prevents the network communications between the mobile device and the transaction management system via the network;

in response to the receiving the indication, facilitating, by the merchant device and using a connection between the merchant device and the transaction management system during the processing of the pending transaction, network communications from the mobile device of the user to the transaction management system, wherein the facilitating the network communications enables the mobile device to continue to perform the processing of the pending transaction in the offline mode with the transaction management system via the merchant device;

transmitting, by the merchant device, a verification message to the mobile device via the wireless communications;

receiving, by the merchant device, a digital token from the mobile device via the wireless communications based on the verification message;

transferring, by the merchant device, the digital token to the transaction management system via the network communications;

receiving, by the merchant device, a transaction notification from the transaction management system via the network communications while the mobile device is in the offline mode based on the processing of the pending transaction using the digital token; and transmitting, by the merchant device, the transaction notification to the mobile device via the wireless communications while the mobile device is in the offline mode.

2. The method of claim 1, wherein the determining that the mobile device is in the offline mode comprises detecting that the mobile device has entered the offline mode during the processing of the pending transaction and lacks the network communications over the network with the transaction management system to complete the processing of the pending transaction.

3. The method of claim 1, further comprising:

maintaining the pending transaction as an open transaction for a period of time; and receiving an indication that the open transaction has been closed during the period of time while the mobile device is in the offline mode.

4. The method of claim 1, wherein the determining that the mobile device is in the offline mode comprises receiving, by the merchant device, the indication from one of the transaction management system over the network or the mobile device via the wireless communications, and wherein the method further comprises:

indicating, to the transaction management system, that the pending transaction will be completed at the merchant device.

5. The method of claim 1, further comprising:

obtaining, from the mobile device and via the wireless communications, a selection of a particular payment instrument for the pending transaction from a plurality of payment instruments associated with the user, wherein the digital token is transferred with the selection to the transaction management system.

6. The method of claim 1, further comprising:

receiving, from the mobile device and via the wireless communications, a transaction cancelation request;

terminating the processing of the pending transaction with the transaction management system; and removing the digital token from the merchant device without completing the pending transaction, wherein the transaction notification indicates that the pending transaction has been canceled.

7. The method of claim 1, wherein the digital token originates from a cloud device of the transaction management system, and wherein the digital token comprises one of a plurality of digital tokens managed for the mobile device using the cloud device.

8. The method of claim 1, wherein the transaction identifier broadcasted by the merchant device is encrypted.

9. The method of claim 1, wherein the digital token is associated with at least one of an account identifier of an account associated with the mobile device, a session identifier of a session between the merchant device and the mobile device, a wallet identifier associated with the mobile device, authorization information for the digital token, transaction details for the pending transaction, usage rules for the digital token, or a lifecycle for the digital token.

10. A merchant device system comprising:

a non-transitory memory storing instructions; and one or more hardware processors coupled to the non-transitory memory and configured to read the instructions from the non-transitory memory to cause the merchant device system to perform operations comprising:

initiating a processing of a pending transaction with a mobile device of a user based on a transaction identifier associated with the pending transaction;

broadcasting the transaction identifier using wireless communications;

receiving, via the wireless communications and responsive to the broadcasting the transaction identifier, an indication that the mobile device is in an offline mode for network communications and is unable to communicate with a transaction management system over a network during the processing of the pending transaction, wherein the offline mode prevents the network communications between the mobile device and the transaction management system via the network;

in response to the receiving the indication, facilitating, using a connection between the merchant device system and the transaction management system during the processing of the pending transaction, the network communications from the mobile device of the user to the transaction management system, wherein the facilitating the communications enables the mobile device to continue to perform the processing of the pending transaction in the offline mode with the transaction management system via the merchant device system;

transmitting a verification message to the mobile device via the wireless communications;

receiving a digital token from the mobile device via the wireless communications based on the verification message;

transferring the digital token to the transaction management system via the network communications;

receiving a transaction notification from the transaction management system via the network communications while the mobile device is in the offline mode based on the processing of the pending transaction using the digital token; and transmitting the transaction notification to the mobile device via the wireless communications while the mobile device is in the offline mode.

11. The merchant device system of claim 10, wherein the determining that the mobile device is in the offline mode comprises detecting that the mobile device has entered the offline mode during the processing of the pending transaction and lacks the network communications over the network with the transaction management system to complete the processing of the pending transaction.

12. The merchant device system of claim 10, wherein the operations further comprise:

maintaining the pending transaction as an open transaction for a period of time; and receiving an indication that the open transaction has been closed during the period of time while the mobile device is in the offline mode.

13. The merchant device system of claim 10, wherein the determining that the mobile device is in the offline mode comprises receiving the indication from one of the transaction management system over the network or the mobile device via the wireless communications, and wherein the operations further comprise:

indicating, to the transaction management system, that the electronic transaction will be completed at the merchant device.

14. The merchant device system of claim 10, wherein the operations further comprise:

obtaining, from the mobile device and via the wireless communications, a selection of a particular payment instrument for the pending transaction from a plurality of payment instruments associated with the user, wherein the digital token is transferred with the selection to the transaction management system.

15. The merchant device system of claim 10, wherein the operations further comprise:

receiving, from the mobile device and via the wireless communications, a transaction cancelation request;

terminating the processing of the pending transaction with the transaction management system; and removing the digital token from the merchant device system without completing the pending transaction, wherein the transaction notification indicates that the pending transaction has been canceled.

16. The merchant device system of claim 10, wherein the digital token originates from a cloud device of the transaction management system, and wherein the digital token comprises one of a plurality of digital tokens managed for the mobile device using the cloud device.

17. The merchant device system of claim 10, wherein the transaction identifier is encrypted.

18. The merchant device system of claim 10, wherein the digital token comprises information associated with one or more of a transaction identifier for the electronic transaction, an account identifier of an account associated with the mobile device, a session identifier of a session between the merchant device system and the mobile device, a wallet identifier associated with the mobile device, transaction details for the pending transaction, usage rules for the digital token, or a lifecycle for the digital token.

19. A non-transitory machine-readable medium having stored thereon machine-readable instructions that, when executed by one or more processors, cause the one or more processors to perform operations comprising:

initiating a processing of a pending transaction with a mobile device of a user based on a transaction identifier associated with the pending transaction;

broadcasting the transaction identifier using wireless communications;

receiving, via the wireless communications and responsive to the broadcasting the transaction identifier, an indication that the mobile device is in an offline mode for network communications and is unable to communicate with a transaction management system over a network during the processing of the pending transaction, wherein the offline mode prevents the network communications between the mobile device and the transaction management system via the network;

in response to the receiving the indication, facilitating, using a connection with the transaction management system during the processing of the pending transaction, the network communications from the mobile device of the user to the transaction management system, wherein the facilitating the communications enables the mobile device to continue to perform the processing of the pending transaction in the offline mode with the transaction management system;

transmitting a verification message to the mobile device via the wireless communications;

receiving a digital token from the mobile device via the wireless communications based on the verification message;

transferring the digital token to the transaction management system via the network communications;

receiving a transaction notification from the transaction management system via the network communications while the mobile device is in the offline mode based on the processing of the pending transaction using the digital token; and transmitting the transaction notification to the mobile device via the wireless communications while the mobile device is in the offline mode.

20. The non-transitory machine-readable medium of claim 19, wherein the determining that the mobile device is in the offline mode comprises detecting that the mobile device has entered the offline mode during the processing of the pending transaction and lacks the network communications over the network with the transaction management system to complete the processing of the pending transaction.

* * * * *